US011327089B2

(12) United States Patent
Shimada et al.

(10) Patent No.: US 11,327,089 B2
(45) Date of Patent: May 10, 2022

(54) AUTOMATIC ANALYSIS DEVICE

(71) Applicant: HITACHI HIGH-TECHNOLOGIES CORPORATION, Tokyo (JP)

(72) Inventors: Masafumi Shimada, Tokyo (JP); Isao Yamazaki, Tokyo (JP); Masaharu Nishida, Tokyo (JP); Yoko Inoue, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 348 days.

(21) Appl. No.: 16/483,458

(22) PCT Filed: Jan. 16, 2018

(86) PCT No.: PCT/JP2018/000907
§ 371 (c)(1),
(2) Date: Aug. 5, 2019

(87) PCT Pub. No.: WO2018/147003
PCT Pub. Date: Aug. 16, 2018

(65) Prior Publication Data
US 2020/0041530 A1  Feb. 6, 2020

(30) Foreign Application Priority Data

Feb. 7, 2017  (JP) .............................. JP2017-020340

(51) Int. Cl.
*G01N 35/02* (2006.01)
*G01N 35/10* (2006.01)

(52) U.S. Cl.
CPC . *G01N 35/1009* (2013.01); *G01N 2035/1018* (2013.01); *G01N 2035/1025* (2013.01)

(58) Field of Classification Search
None
See application file for complete search history.

(56) References Cited

U.S. PATENT DOCUMENTS

2004/0034479 A1 *  2/2004  Shimase ............ G01N 35/1016
                                                                    702/19
2011/0267198 A1   11/2011  Ohga et al.
(Continued)

FOREIGN PATENT DOCUMENTS

EP     2 752 667 A1    7/2014
EP     2 891 888 A1    7/2015
(Continued)

OTHER PUBLICATIONS

International Search Report of PCT/JP2018/000907 dated Feb. 27, 2018.
(Continued)

*Primary Examiner* — Kathryn Wright
(74) *Attorney, Agent, or Firm* — Mattingly & Malur, PC

(57) ABSTRACT

The purpose of the present invention is to provide an automatic analysis device capable of determining, through a simple processing, whether or not idle aspirate has occurred. The automatic analysis device according to the present invention determines whether or not idle aspirate has occurred, by calculating a parameter which specifies whether or not the length of a portion of a path through which the sample passes inside a dispensing probe is shorter than that during normal aspirate, the portion being actually filled with a sample (see FIG. 4).

5 Claims, 8 Drawing Sheets

(56) References Cited

U.S. PATENT DOCUMENTS

| | | | |
|---|---|---|---|
| 2014/0220693 A1 | 8/2014 | Yamazaki et al. | |
| 2015/0219680 A1 | 8/2015 | Mimura et al. | |
| 2015/0362514 A1* | 12/2015 | Tam ................. | G01N 35/00623 422/509 |
| 2017/0089938 A1 | 3/2017 | Tamezane et al. | |

FOREIGN PATENT DOCUMENTS

| | | |
|---|---|---|
| JP | 2003-254982 A | 9/2003 |
| JP | 2004-271266 A | 9/2004 |
| JP | 2009-058318 A | 3/2009 |
| JP | 2013-053868 A | 3/2013 |
| JP | 2014-044174 A | 3/2014 |
| WO | 2015/174226 A1 | 11/2015 |

OTHER PUBLICATIONS

Extended European Search Report received in corresponding European Application No. 18751052.4 dated Oct. 26, 2020.

\* cited by examiner

AUTOMATIC ANALYSIS DEVICE

TECHNICAL FIELD

The present invention relates to an automatic analysis device that analyzes a sample.

BACKGROUND ART

The automatic analysis device is a device in which a sample such as urine or blood collected from an examinee is mixed with a reagent to react with each other such that a change in color tone occurs and this change is measured using a spectrophotometer.

The automatic analysis device adjusts a dispensing probe in advance such that the dispensing probe is moved down lower than a liquid level of the sample to aspirate the sample. Accordingly, when the liquid level is erroneously recognized, there is a possibility that an appropriate amount of the sample cannot be aspirated (or the sample cannot be aspirated at all). This erroneous operation is referred to as "idle aspiration". For example, when a bubble is generated on the liquid level of the sample, the surface of the bubble is erroneously recognized as the liquid level of the sample and then the aspiration is executed at this height such that idle aspiration may occur.

In JP-A-2013-53868 (PTL 1), "in order to realize an automatic analysis device that accurately detects dispensing abnormalities caused by various causes without requiring an enormous amount of reference data such that analysis can be executed with high reliability", a technique is disclosed as follows: "in a state where a tip of a sample probe 15 is immersed in a sample, a plunger 66 is moved down by a predetermined amount to aspirate the sample into the probe. A pressure variation during the aspiration operation is detected by a pressure sensor 26, the detected variation is converted into digital data by an AD converter 621, and the digital data is transmitted to a signal processor 76. The signal processor 76 extracts values of feature variables of an aspiration waveform and calculates a statistical distance D from normal group data. The statistical distance D and a threshold th are compared to each other, and when the statistical distance D is greater than or equal to the threshold th, it is determined that the aspiration operation is abnormal. When the statistical distance D is less than the threshold th, the process proceeds to a discharging operation. After the discharging operation, values of feature variables of a discharge waveform are extracted, and a statistical distance D is calculated from normal group data. When the statistical distance D is greater than or equal to a predetermined threshold th, it is determined that the discharging operation is abnormal." (refer to Abstract).

CITATION LIST

Patent Literature

PTL 1: JP-A-2013-53868

SUMMARY OF INVENTION

Technical Problem

In the technique described in PTL 1, whether or not idle aspiration occurs is determined by calculating feature variables of a pressure waveform during aspiration of a sample and comparing the calculated feature variables to feature variables of a normal waveform. However, in the technique described in PTL 1, feature variables that are not necessary to determine whether or not idle aspiration occurs are also obtained. Therefore, it is considered that an arithmetic load or a duration for the determination tends to increase.

The present invention has been made in consideration of the above-described circumstances, and an object thereof is to provide an automatic analysis device capable of determining whether or not idle aspiration occurs through simple processing.

Solution to Problem

The automatic analysis device according to the present invention determines whether or not idle aspiration has occurred, by calculating a parameter which specifies whether or not the length of a portion of a path through which the sample passes inside a dispensing probe is shorter than that during normal aspiration, the portion being actually filled with a sample.

Advantageous Effects of Invention

The automatic analysis device according to the present invention determines idle aspiration using parameters relating to the length of the path inside the dispensing probe. Therefore, the parameters calculated for the determination can be narrowed. As a result, idle aspiration can be determined through simpler processing, and thus the cost efficiency, the arithmetic time, or the like of the device can be improved.

DESCRIPTION OF EMBODIMENTS

Embodiment 1

Figure 1:
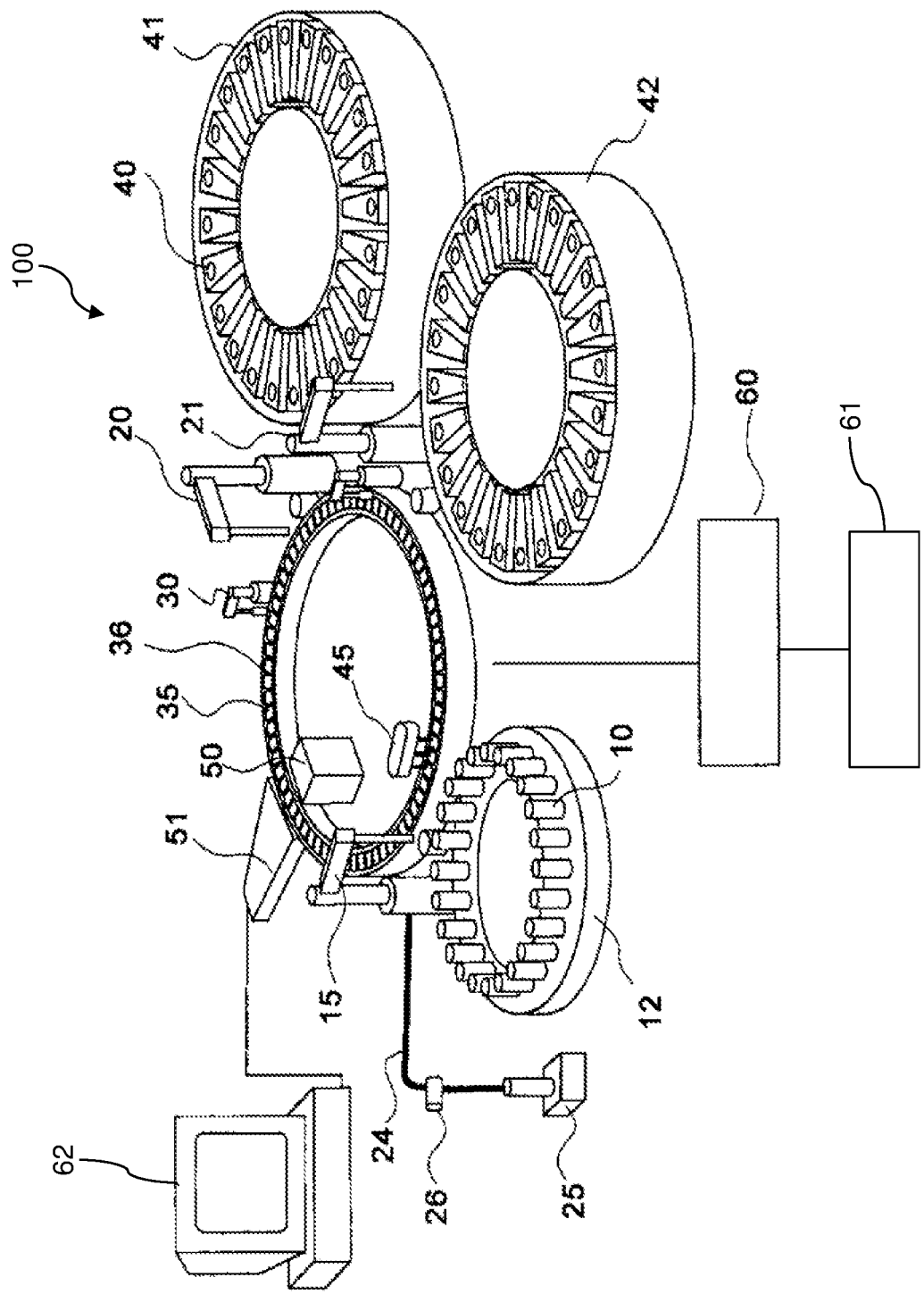
FIG. 1 is a schematic configuration diagram illustrating an automatic analysis device 100 according to Embodiment 1.

FIG. 1 is a schematic configuration diagram illustrating an automatic analysis device 100 according to Embodiment 1 of the present invention. The automatic analysis device 100 includes a sample disk 12, a first reagent disk 41, a second reagent disk 42, and a reaction disk 36. On the sample disk 12, a sample container 10 that holds a sample can be loaded. On the first reagent disk 41 and the second reagent disk 42, a reagent container 40 that holds a reagent can be loaded. A reaction container 35 is arranged on a circumference of the reaction disk 36.

The automatic analysis device 100 further includes a sample probe 15, a first reagent probe 20, a second reagent probe 21, a stirring device 30, a container cleaning mechanism 45, a light source 50, a spectroscopic detector 51, a computer 62, a controller 60, and a timing detecting unit 61.

The sample probe 15 dispenses the sample aspirated from the sample container 10 into the reaction container 35. The first reagent probe 20 dispenses the reagent aspirated from the reagent container 40 in the first reagent disk 41 into the reaction container 35. The second reagent probe 21 dispenses the reagent aspirated from the reagent container 40 in the second reagent disk 42 into the reaction container 35. The stirring device 30 stirs the liquid in the reaction container 35. The container cleaning mechanism 45 cleans the reaction container 35. The light source 50 is provided near an inner circumference of the reaction disk 36 and emits light to the reaction container 35. The spectroscopic detector 51 is provided on a surface facing the light source 50 with the reaction container 35 interposed therebetween and detects light emitted to the sample by the light source 50. The computer 62 is connected to the spectroscopic detector 51 and analyzes the sample using the detection result of the spectroscopic detector 51. The controller 60 controls an overall operation of the automatic analysis device 100. The timing detecting unit 61 detects an operation start/stop timing of each driving mechanism and monitors the passage of time from an operation start/stop.

The sample probe 15 is connected to the metering pump 25 through a dispensing flow path 24. A pressure sensor 26 is provided halfway on the dispensing flow path 24. Although not illustrated in FIG. 1, the dispensing flow path, the metering pump, and the pressure sensor are connected to the first reagent probe 20 and the second reagent probe 21 as in the sample probe 15.

The sample as an examination object such as blood is put into the sample container 10 and is set on the sample disk 12. The type of analysis to be executed on each of the samples is input to the controller 60. A certain amount of the sample collected from the sample container 10 by the sample probe 15 is dispensed into the reaction container 35 arranged in the reaction disk 36. A certain amount of reagent is dispensed into the reaction container 35 from the reagent container 40 provided in the first reagent disk 41 or the second reagent disk 42 by the first reagent probe 20 or the second reagent probe 21 and stirring is performed by the stirring device 30. The amounts of the sample and the reagent dispensed can be set in the controller 60 in advance depending on the type of analysis.

The reaction disk 36 periodically repeats rotation and stop. The spectroscopic detector 51 measures light at a timing at which the reaction container 35 passes through a region before the light source 50. The photometry is repeated during a reaction time of 10 minutes. Next, the container cleaning mechanism 45 discharges the reaction solution in the reaction container 35 and cleans the reaction container 35. During the cleaning, another reaction container 35 operates in parallel using another sample and another reagent. The computer 62 calculates the concentrations of components corresponding to the type of analysis using the data measured by the spectroscopic detector 51 and displays the result on a display.

Figure 2:
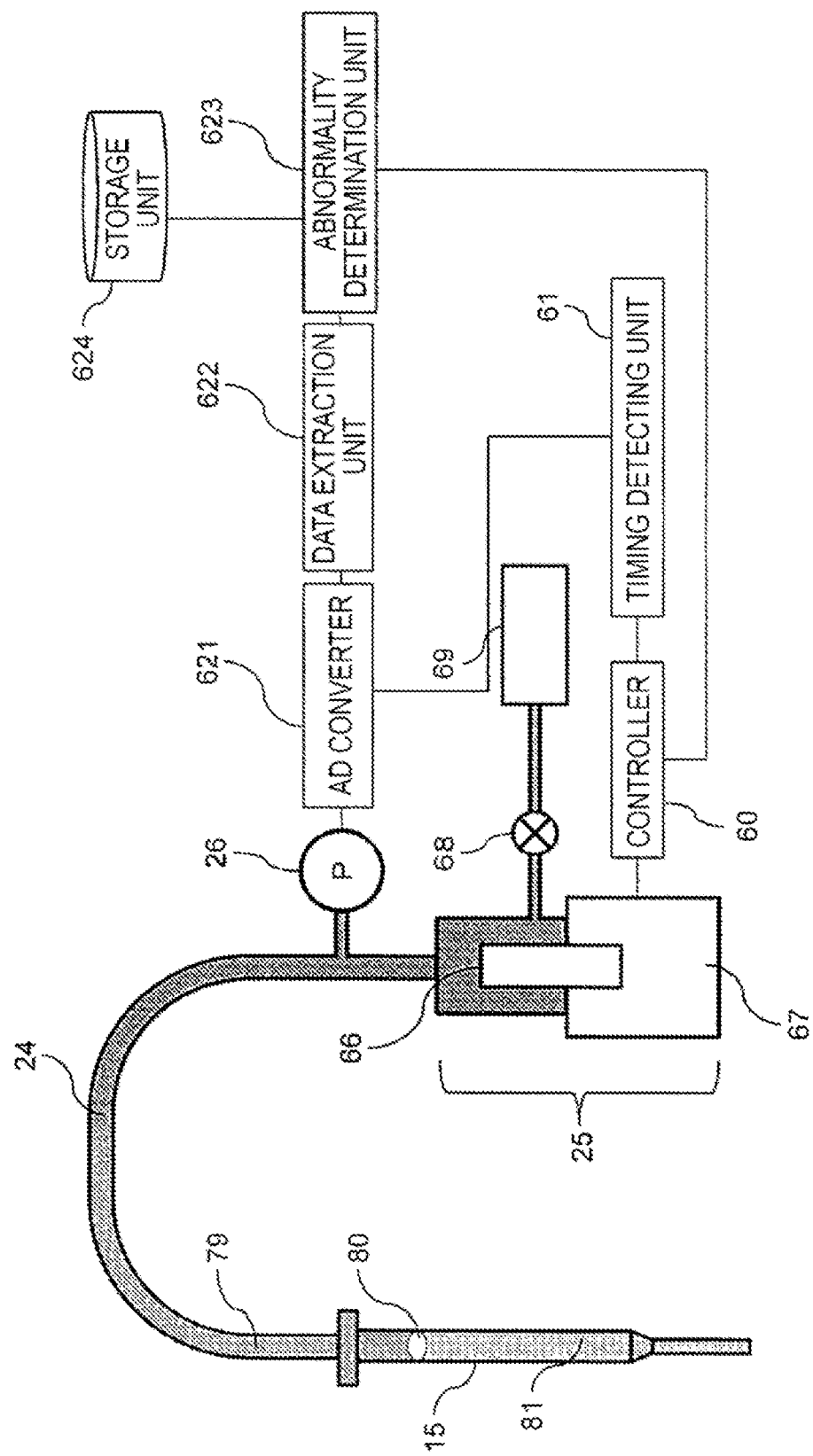
FIG. 2 is a diagram illustrating a peripheral configuration of a sample probe 15.

FIG. 2 is a diagram illustrating a peripheral configuration of the sample probe 15. Since the first reagent probe 20 and the second reagent probe 21 have the same configuration as the sample probe 15, hereinafter, the peripheral configuration of the sample probe 15 will be described.

The metering pump 25 includes a driving mechanism 67 and a plunger 66 and is connected to a pump 69 through a valve 68. The metering pump 25 is controlled by the controller 60 and aspirates or discharges the sample. The metering pump 25 and the sample probe 15 are connected to each other through the dispensing flow path 24. The pressure sensor 26 is arranged between the plunger 66 and the sample probe 15.

The timing detecting unit 61 is connected to the controller 60 and has a function of monitoring an operation end timing of the metering pump 25 and an elapsed time from the operation start.

The pressure sensor 26 is connected to the AD converter 621. When a time described below elapses after stopping the metering pump 25, the timing detecting unit 61 instructs the AD converter 621 to execute digital conversion (also outputs a clock signal). The AD converter 621 converts analog voltage data output from the pressure sensor 26 into digital data in accordance with the instruction.

A data extraction unit 622 receives digital data of a pressure waveform from the AD converter 621 and delivers the received digital data to an abnormality determination unit 623. The abnormality determination unit 623 determines whether or not idle aspiration occurs using the data. The AD converter 621, the data extraction unit 622, and the abnormality determination unit 623 can be configured, for example, as a part of the computer 62.

The sample probe 15 has a moving mechanism (not illustrated). By the moving mechanism moving the sample probe 15 up and down and rotating the sample probe 15, the sample probe 15 can move to a position where the probe aspirates the sample from the sample container 10 and can move to a position where the probe discharges the sample to the reaction container 35.

Before the aspiration of the sample, the controller 60 opens the valve 68 such that the dispensing flow path 24 and the sample probe 15 are filled with a system solution 79 supplied from the pump 69. Next, in a state where a tip of the sample probe 15 is in the air, the controller 60 causes the driving mechanism 67 to move the plunger 66 down such that segmented air 80 is aspirated.

Next, the controller 60 moves the sample probe 15 down into the sample container 10 such that the tip of the sample probe 15 is immersed in the sample. In this state, the plunger 66 moves down by a predetermined amount and aspirates the sample into the probe. As a result, the sample is aspirated into the sample probe 15 as an aspiration solution 81. The first reagent probe 20 and the second reagent probe 21 also executes the same operation. In this case, however, the aspiration solution 81 is the reagent.

Figure 3:
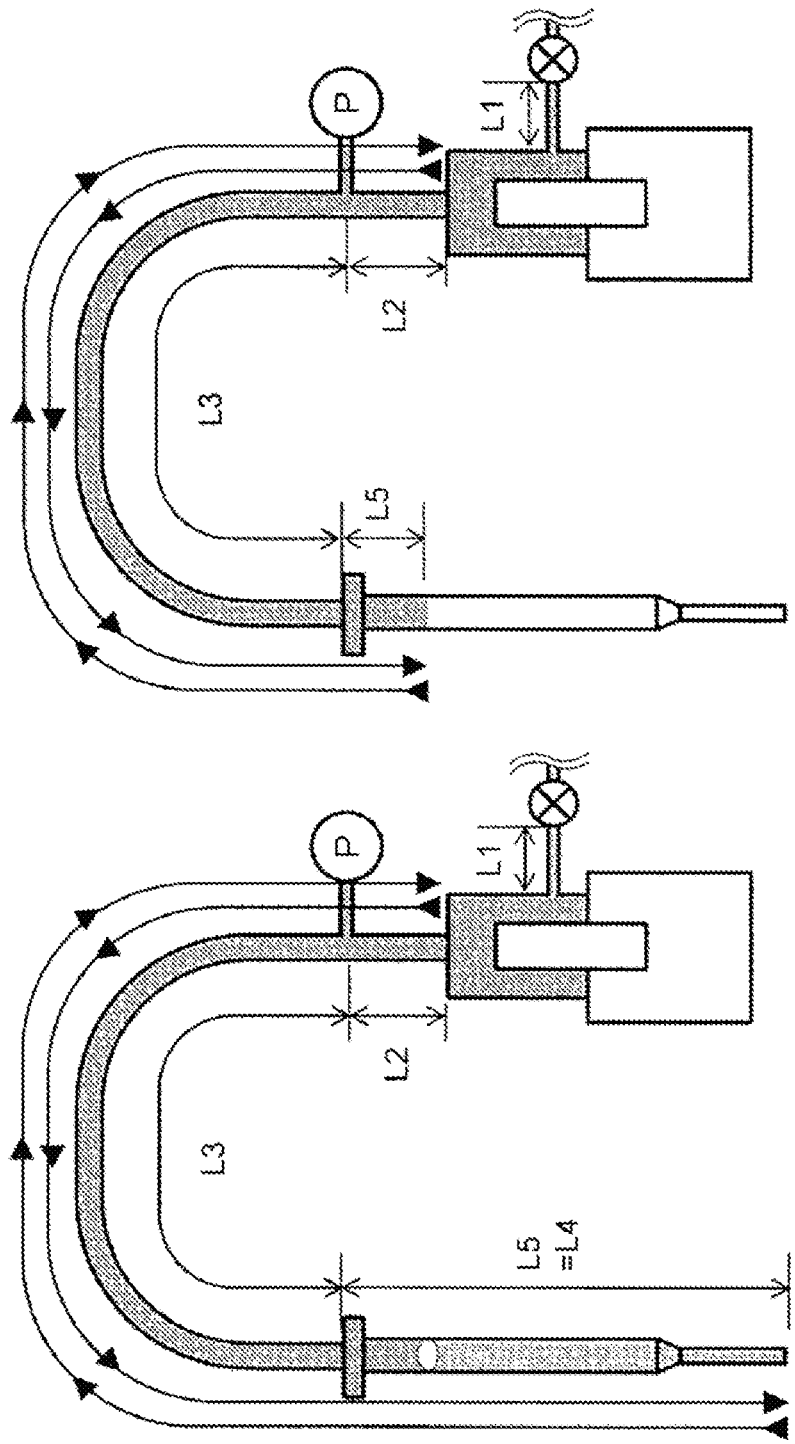
FIG. 3 is a diagram illustrating a mechanism in which a pressure waveform of normal aspiration is different from a pressure waveform of idle aspiration.

FIG. 3 is a diagram illustrating a mechanism in which a pressure waveform of normal aspiration is different from a pressure waveform of idle aspiration. A shock wave generated after stopping the metering pump 25 propagates through the system solution 79 and the aspiration solution 81 filling the flow path. A shock wave generated from the metering pump 25 propagates through a region in the flow path filled with liquid, reflects from an air layer (a terminal portion of liquid), passes through the pressure sensor 26 again, and reflects from the valve 68. The shock wave repeats reciprocation in the flow path while attenuating the energy. The segmented air 80 has an extremely small volume and thus does not affect the pressure propagation.

A length of a flow path that connects the valve 68 and a syringe in the flow path is set as L1, a distance from the metering pump 25 to the pressure sensor 26 is set as L2, a length of a flow path from the pressure sensor 26 to the sample probe 15 is set as L3, a length of the sample probe is set as L4, and a length of liquid held in a nozzle at the end of aspiration is set as L5. When the aspiration operation is normally executed, L5=L4 is satisfied, and the distance from the valve 68 to a tip of the liquid satisfies (L1+L2+L3+L4). During idle aspiration, the amount of the sample aspirated is less than that during normal aspiration (or the sample is not aspirated at all). Therefore, the length L5 of a portion filled with the liquid in the sample probe 15 is shorter than L4. Accordingly, the propagation distance of the shock wave is shorter than that during normal aspiration. Using this configuration, whether or not idle aspiration occurs can be determined. Hereinafter, specific description will be made.

Figure 4:
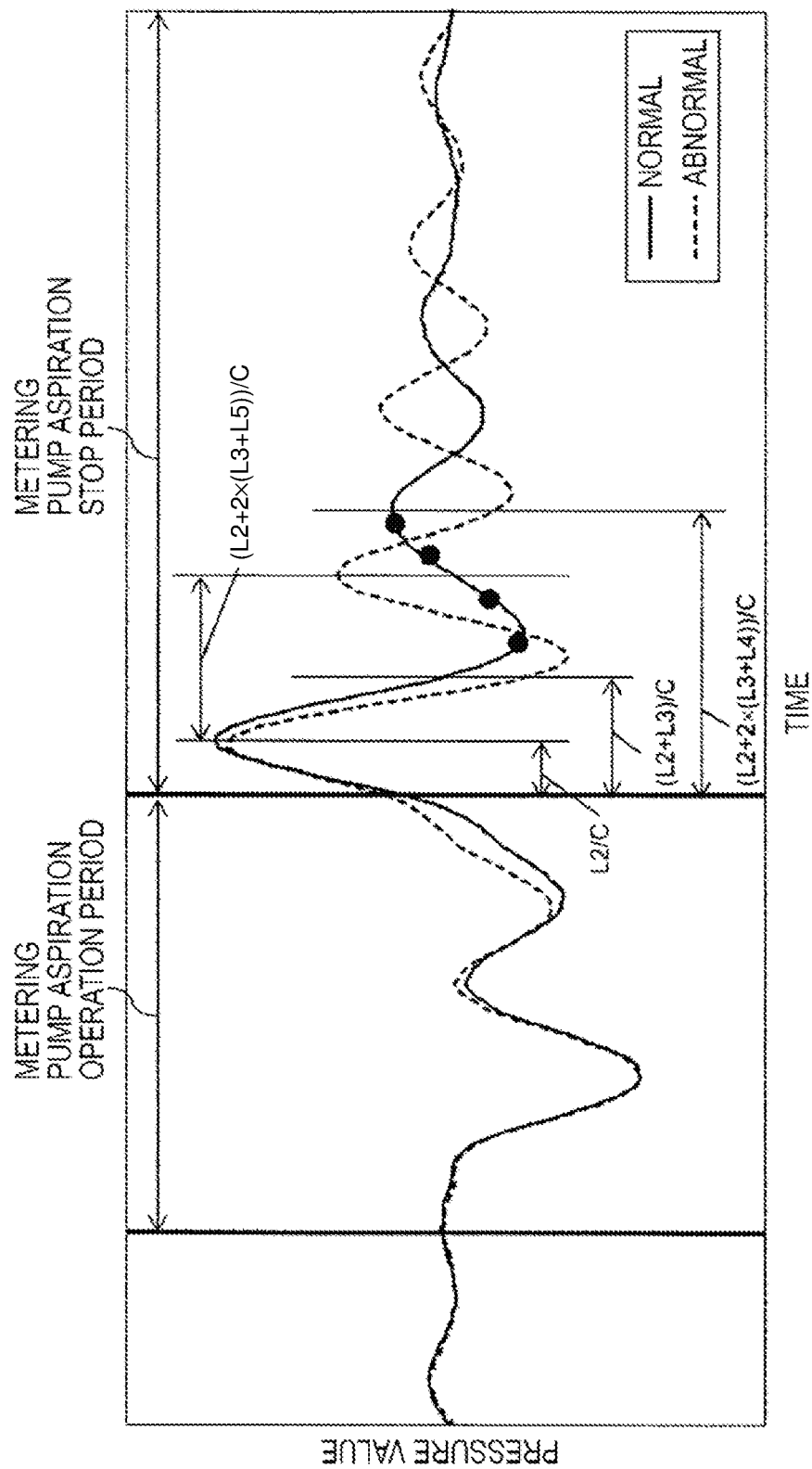
FIG. 4 is a graph illustrating waveforms of shock waves detected by a pressure sensor.

FIG. 4 is a graph illustrating waveforms of shock waves detected by the pressure sensor. A solid line represents a pressure waveform during normal aspiration, and a dotted line represents a pressure waveform during idle aspiration. The pressure sensor 26 outputs the detected pressure, for example, as a voltage value. FIG. 4 illustrates a pressure value converted from the voltage value. Data describing the pressure waveform during normal aspiration can be stored, for example, in the storage unit 624 included in the computer 62 in advance.

During a period during which the metering pump 25 executes an aspiration operation, the plunger 66 moves down to aspirate the sample from the tip of the sample probe 15. During the aspiration period, the pressure in the sample probe 15 decreases.

After the aspiration of the sample ends, the metering pump 25 stops the aspiration operation. When the metering pump 25 stops the operation, initially, a steep positive pressure variation appears. This positive pressure variation is detected when a shock wave passes through the pressure sensor 26, the shock wave being generated when the operation of moving the plunger 66 down is stopped. Accordingly, when a propagation velocity of the shock wave is set as C, a period from when the metering pump 25 stops the aspiration operation to when the positive pressure variation is detected substantially satisfies L2/C during normal aspiration and during idle aspiration. Accordingly, the pressure waveform during this period is not suitable for distinguishing between normal aspiration and idle aspiration.

When the shock wave propagated up to the air layer (the tip of the liquid) reflects and passes through the pressure sensor 26 again, the pressure waveform reaches a second peak. A period from when the metering pump 25 stops the aspiration operation to when the pressure waveform reaches the second peak satisfies (L2+2×(L3+L4))/C during normal aspiration but satisfies (L2+2×(L3+L5))/C during idle aspiration. Similarly, an arrival time of a third or subsequent peak during normal aspiration is also different from that during idle aspiration. That is, since the pressure waveform during normal aspiration is clearly different from that during idle aspiration, the abnormality determination unit 623 can determine idle aspiration using this configuration.

The distance by which the shock wave generated from the metering pump 25 reaches a boundary between the dispensing flow path 24 and the sample probe 15 from the metering pump 25 satisfies L2+L3 during normal aspiration and during idle aspiration. Therefore, the pressure waveform during this period is not necessary to determine idle aspiration. Accordingly, the abnormality determination unit 623 may determine idle aspiration using only a pressure value after (L2+L3)/C elapses since the metering pump 25 stops the aspiration operation.

A difference between the pressure waveform during normal aspiration and the pressure waveform during idle aspiration clearly appears at the second or subsequent peak. Therefore, it is necessary to determine idle aspiration using a pressure value until at least the second peak appears. Accordingly, the abnormality determination unit 623 needs to determine idle aspiration using a pressure value for a period during which (L2+2×(L3+L4))/C elapses after the metering pump 25 stops the aspiration operation. In order to allow a margin, a pressure value for a period during which an integer multiple of (L2+2×(L3+L4))/C elapses may be used.

A timing at which the abnormality determination unit 623 acquires data used for determining idle aspiration can be controlled by the timing detecting unit 61. The timing detecting unit 61 instructs the AD converter 621 every predetermined clock period to sample the pressure value for the period from the pressure sensor 26. Optionally, the data extraction unit 622 converts the acquired digital data into a pressure value and delivers the converted pressure value to the abnormality determination unit 623.

When it is assumed that a shock wave is a damped vibration represented by the following expression, the abnormality determination unit 623 estimates a parameter represented by the following Expression 1 using the acquired pressure waveform. In Expression 1, ω0 represents a damped period.

[Numerical Expression 1]

$$f(t)=Ce^{-\varsigma\omega 0 t}\cos(\cos(\omega 0\sqrt{1-\varsigma^2}t-\alpha)+A \quad (1)$$

The storage unit 624 stores data describing each of parameters of the expression in advance regarding the pressure waveform during normal aspiration. The abnormality determination unit 623 compares each of the estimated parameters to the corresponding parameter during normal aspiration. When a difference between the parameters is within a predetermined threshold, the abnormality determination unit 623 determines that the aspiration operation is normal aspiration. When a difference between the parameters is not within a predetermined threshold, the abnormality determination unit 623 determines that the aspiration operation is idle aspiration. Any one of the parameters may be used for the comparison, or two or more parameters may be applied to, for example, an appropriate evaluation expression to evaluate differences between the parameters.

The abnormality determination unit 623 notifies the determination result to the controller 60. When the controller 60 determines that the aspiration operation is normal aspiration, the controller 60 discharges the sample from the sample probe 15 to the reaction container 35 and dispenses the next sample. When the controller 60 determines that the aspiration operation is idle aspiration, the controller 60 stops the operation of discharging the sample and displays an alarm on a screen of the computer 62. Further, by opening and closing the valve 68, the inside of the sample probe 15 is cleaned.

Embodiment 2

In order to suppress error for the amount of the sample held in the sample probe 15, the automatic analysis device 100 slightly operates the plunger 66 to the discharge side before pulling up the sample probe 15 from the sample after completing the aspiration operation. This operation is referred to as "backlash correction". In Embodiment 2 of the present invention, a method of determining idle aspiration using a pressure waveform during the backlash correction will be described.

Figure 5:
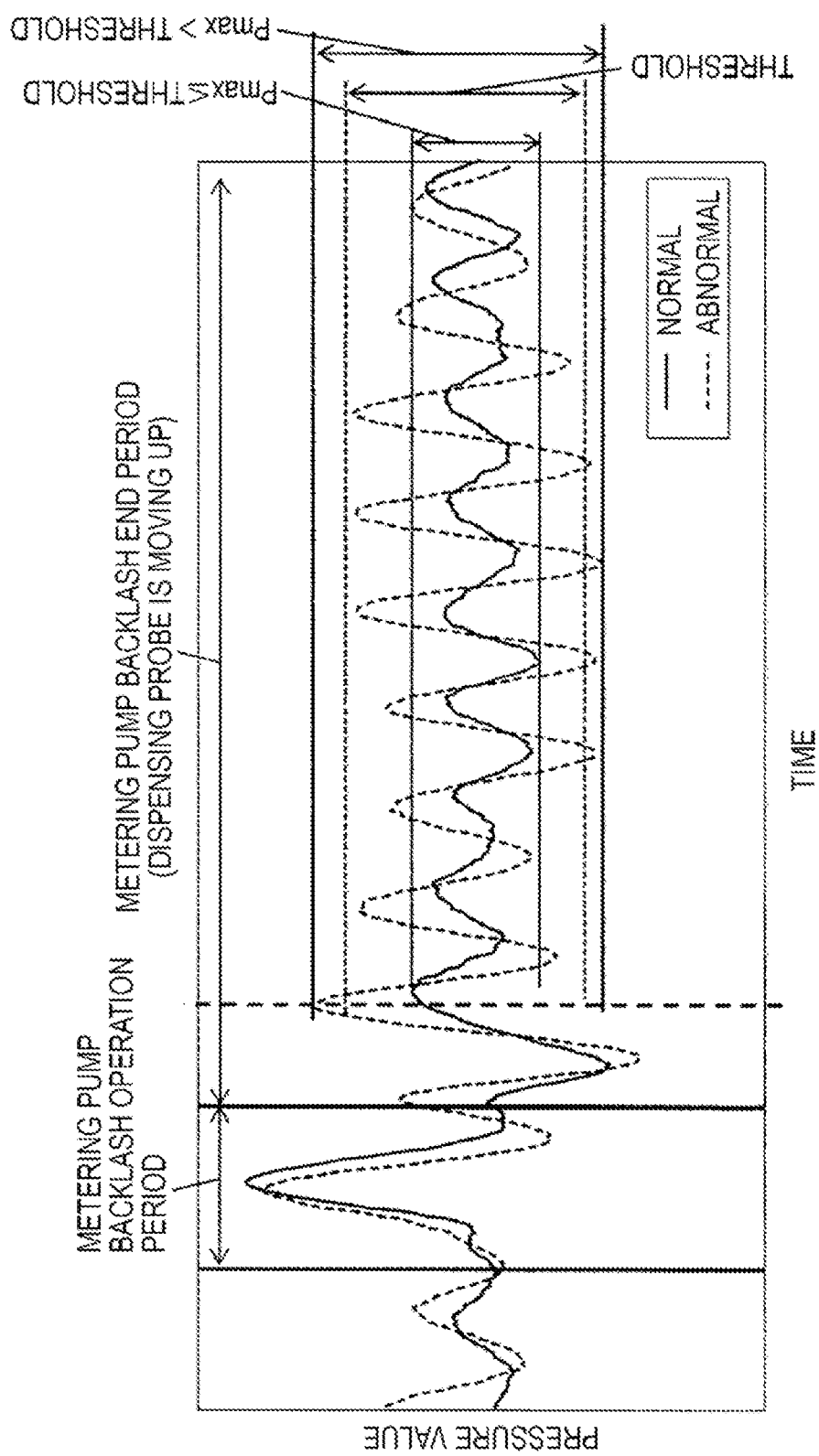
FIG. 5 is a graph illustrating pressure waveforms detected by a pressure sensor 26 before and after a backlash operation.

FIG. 5 is a graph illustrating a pressure waveform detected by the pressure sensor 26 before and after the backlash operation. The pressure waveforms illustrated in FIG. 5 are continuous from the pressure waveforms during the aspiration operation illustrated FIG. 4. The metering pump 25 executes the backlash correction after the completion of the aspiration operation. After the backlash correction is completed, the plunger 66 is stopped and the sample probe 15 is pulled up from the sample.

During that time, a pressure variation occurs in the flow path due to a shock wave generated when the plunger 66 is stopped and the inertia generated when the sample probe 15 moves up. Unlike Embodiment 1, a plurality of vibration factors are combined, and thus this pressure variation does not become a damped vibration. However, since the amount of the solution filling the flow path during normal aspiration is different from that during idle aspiration, there is a difference. Specifically, during normal aspiration where the flow path is filled with the liquid, the amplitude of the pressure waveform is small. During idle aspiration where a region filled with the liquid is small, the amplitude is large. The abnormality determination unit 623 determines idle aspiration using this configuration.

When L2/C elapses after the metering pump 25 completes the backlash correction, a first pressure peak appears. The timing detecting unit 61 may instruct the AD converter 621 to acquire only the pressure waveform after the first pressure peak. The timing detecting unit 61 acquires the pressure waveform until the sample probe 15 is completely moved up.

The abnormality determination unit 623 calculates a difference Pmax between a maximum value and a minimum value of the pressure waveform. When Pmax is within a predetermined threshold, the abnormality determination unit 623 determines that the aspiration operation is normal aspiration. When Pmax is not within the predetermined threshold, the abnormality determination unit 623 determines that the aspiration operation is idle aspiration.

Embodiment 3

Figure 6:
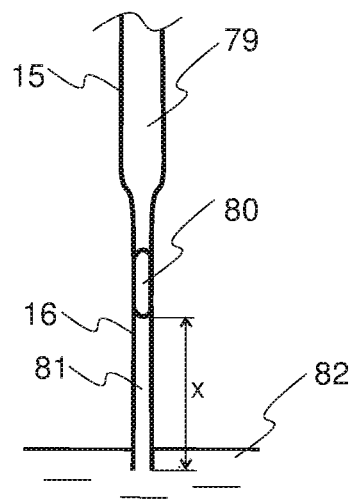
FIG. 6 is a side view illustrating the sample probe 15 included in the automatic analysis device 100 according to Embodiment 3.

FIG. 6 is a side view illustrating the sample probe 15 included in the automatic analysis device 100 according to Embodiment 3 of the present invention. In a case where idle aspiration is determined particularly focusing on the time when the second peak is reached among the differences between the pressure waveforms described in FIG. 4, it is desirable that the difference between L4 and L5 is significant. In Embodiment 3, a narrow pipe portion 16 is elongated. For example, the narrow pipe portion 16 is a pipe formed of stainless steel and has an inner diameter of 0.8 mm and a length of 50 mm. x represents the length of the aspiration solution 81 aspirated.

Figure 7:
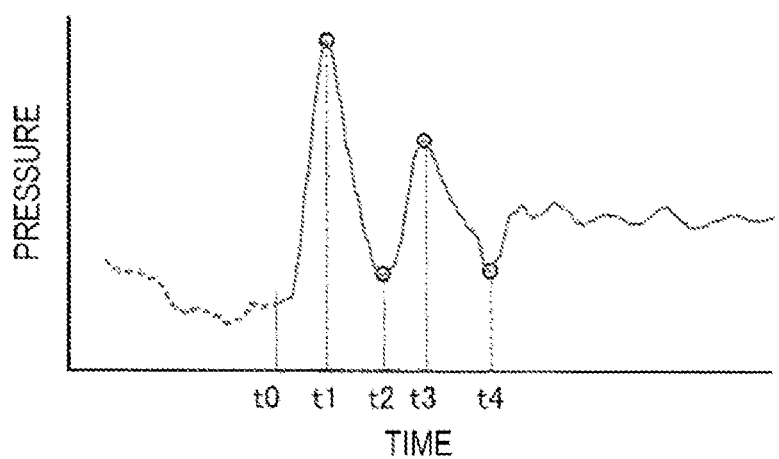
FIG. 7 is a graph illustrating an example of a pressure waveform and peak detection.

FIG. 7 is a graph illustrating an example of a pressure waveform and peak detection. A time when the metering pump 25 stops the aspiration operation is set as t0, a time of a first pressure maximum value is set as t1, a time of a first pressure minimum value is set as t2, a time of a second pressure maximum value is set as t3, and a time of a second pressure minimum value is set as t4. In the automatic analysis device 100, data describing the times during normal aspiration are stored in the storage unit 624 in advance. The abnormality determination unit 623 can determine idle aspiration by comparing t1 to t4 to those during normal aspiration.

Figure 8:
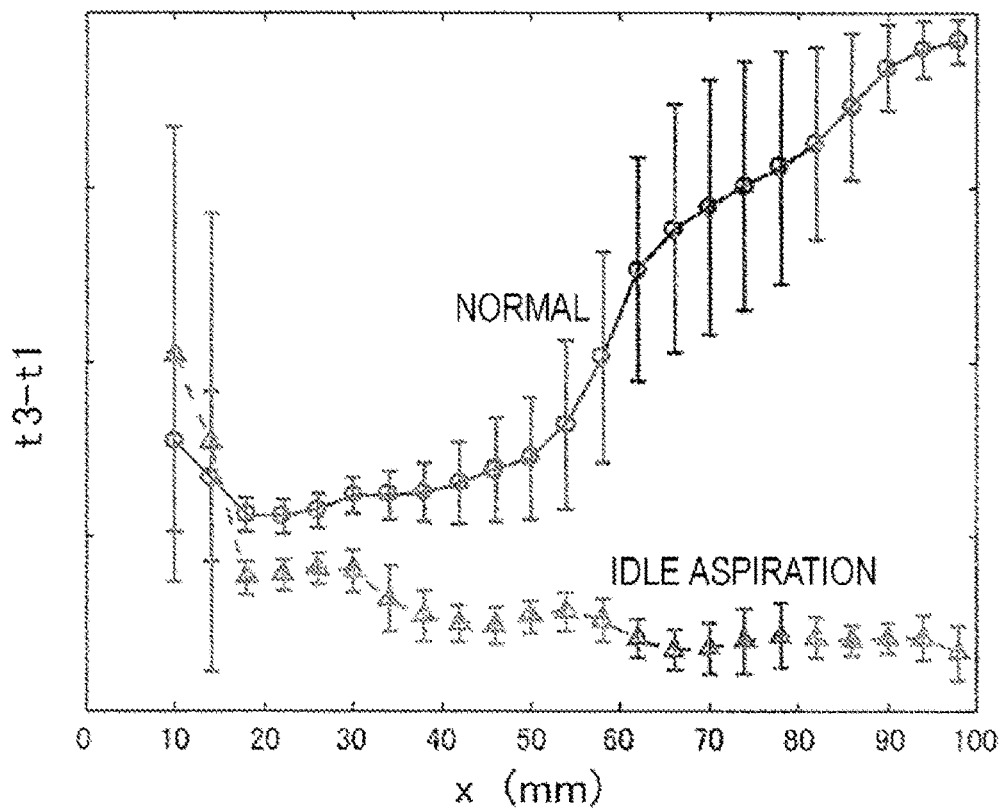
FIG. 8 is a graph illustrating a result of measuring a relationship between an aspiration length x and a maximum value interval of a pressure waveform.

FIG. 8 is a graph illustrating a result of measuring a relationship between an aspiration length x and a maximum value interval of a pressure waveform. The horizontal axis represents the aspiration length x, and the vertical axis represents t3-t1 in FIG. 7. As illustrated in FIG. 8, when the aspiration length x is substantially greater than or equal to 20 mm, t3-t1 during normal aspiration is clearly different from t3-t1 during idle aspiration. Therefore, by comparing these values to each other, idle aspiration can be determined. t3-t1 during normal aspiration can be stored in the storage unit 624 in advance. When the difference between the values is greater than a predetermined threshold, idle aspiration can be determined.

In Embodiment 3, the narrow pipe portion 16 is elongated. Therefore, with the same aspiration amount, the aspiration length x can be increased. Accordingly, as illustrated in FIG. 8, the difference between t3-t1 during normal aspiration and t3-t1 during idle aspiration clearly appears. Therefore, idle aspiration can be accurately determined.

In Embodiment 3, the pressure peak after the metering pump 25 stops the aspiration operation is used. Therefore, irrespective of a driving pattern of the metering pump 25, the difference between the pressure waveform during normal aspiration and the pressure waveform during idle aspiration can be accurately identified. In addition, since idle aspiration is determined using only the pressure peak interval, the arithmetic amount can be reduced.

In Embodiment 3, t3 and t1 of FIG. 7 are used. Therefore, it is not necessary to exactly specify the other times of FIG. 7. For example, a pressure value starts to be acquired from the time when the metering pump 25 is instructed to stop the aspiration operation, and the time when the second maximum value is reached can be set as t3.

Embodiment 4

In Embodiment 1, when the abnormality determination unit 623 compares the measurement result of the pressure sensor 26 to the pressure waveform during normal aspiration, this comparison may also be executed after approximating the measurement result using an approximate expression. For example, the timing detecting unit 61 outputs a sampling signal at least 5 times during a variation period of the pressure waveform. The abnormality determination unit 623 obtains each of the parameters (C, ζ, ω0, α, and A) of Expression 1, for example, by curve fitting using a method of least squares such that a difference between each sample point and Expression 1 is the minimum.

Figure 9:
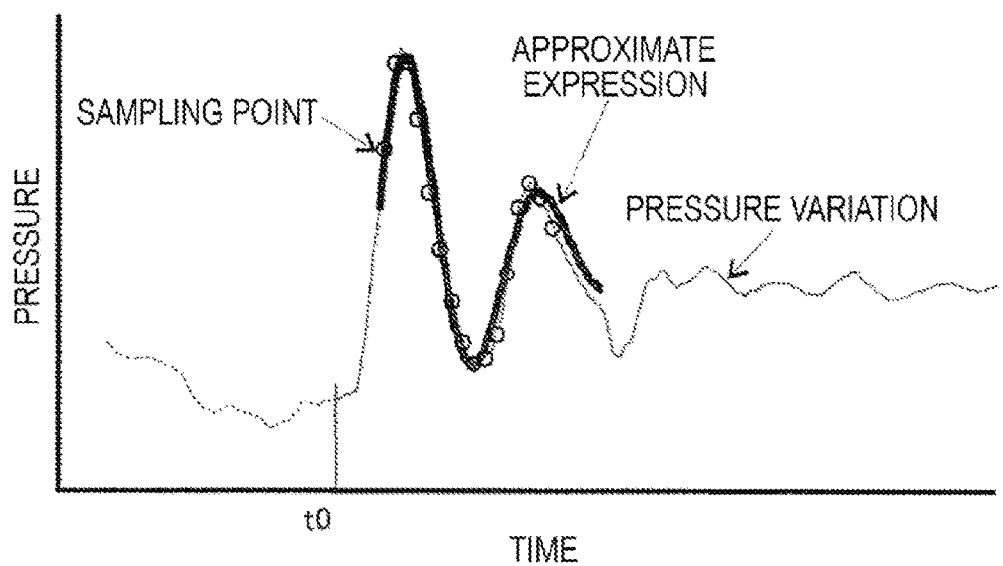
FIG. 9 is a graph illustrating one example of an approximate expression.

FIG. 9 is a graph illustrating one example of the approximate expression. An approximate expression that is calculated using a sampling point after the time t0 when the metering pump 25 stops the aspiration operation matches well the actual pressure waveform during the same period.

Figure 10:
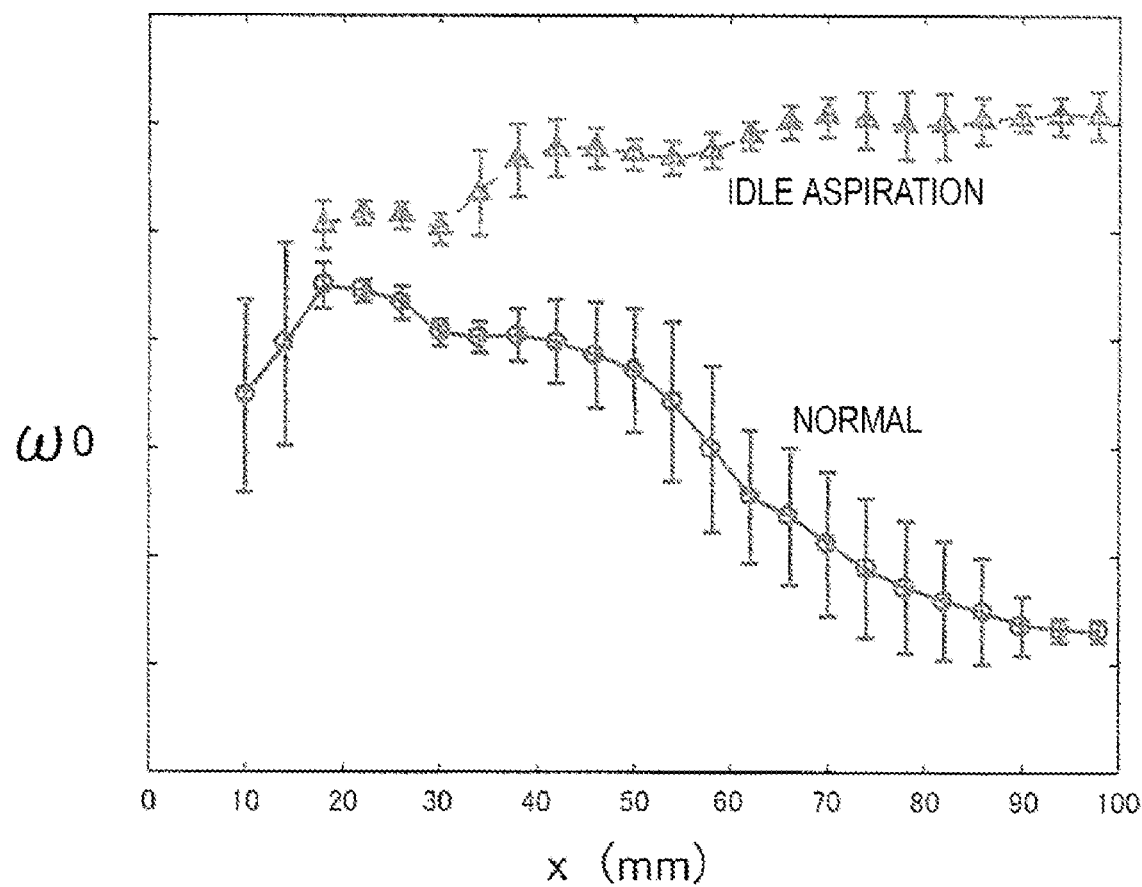
FIG. 10 is a graph illustrating a difference between the value during normal aspiration and the value during idle aspiration regarding $\omega 0$ of Expression 1.

FIG. 10 is a graph illustrating a difference between the value during normal aspiration and the value during idle aspiration regarding ω0 of Expression 1. The horizontal axis represents the aspiration length x, and the vertical axis represents ω0. As illustrated in FIG. 10, when the aspiration length x is substantially greater than or equal to 20 mm, ω0 during normal aspiration is clearly different from ω0 during idle aspiration. Therefore, by comparing these values to each other, idle aspiration can be determined. ω0 during normal aspiration can be stored in the storage unit 624 in advance. When the difference between the values is greater than a predetermined threshold, the aspiration operation can be determined as idle aspiration.

In Embodiment 4, the parameters of the approximate expression are five, whereas five or more sampling points of the pressure waveform are acquired. Therefore, the approximation parameters can be correctly estimated by curve fitting. By further increasing the number of sampling points, the effect of noise can also be suppressed.

In Embodiment 4, idle aspiration is determined using only $\omega 0$ having the clearest difference between the value during normal aspiration and the value during idle aspiration. Therefore, idle aspiration can be accurately determined. The reason for this is that the other parameters of Expression 1 are largely affected by factors other than the difference between the value during normal aspiration and the value during idle aspiration.

Regarding Modification Example of Present Invention

The present invention is not limited to the embodiments and includes various modification examples. For example, the embodiments have been described in detail in order to easily describe the present invention, and the present invention is not necessarily to include all the configurations described above. In addition, a part of the configuration of one embodiment can be replaced with the configuration of another embodiment. Further, the configuration of one embodiment can be added to the configuration of another embodiment. In addition, for a part of the configuration each of the embodiments, addition, deletion, and replacement of another configuration can be made.

In Embodiment 3, when the dispensing amount required for analyzing the sample is small, the aspiration length x can be secured to be sufficiently large by aspirating the aspiration solution 81 in an amount more than necessary.

In the description of Embodiment 1, idle aspiration is determined by calculating the parameters of Expression 1 and evaluating the obtained parameters. In addition to this configuration, for example, as described in PTL 1, idle aspiration can also be determined by calculating feature variables from a sampling point and comparing the feature variables to those during normal aspiration. The priority of the determination results obtained using the methods according to the present invention can be determined, for example, by weighting.

In the above-described embodiments, the AD converter 621, the data extraction unit 622, and the abnormality determination unit 623 have been described as a part of the computer 62. However, the main body of the automatic analysis device 100 may include these functional units.

In addition, a part of the AD converter 621, the data extraction unit 622, and the abnormality determination unit 623 may be realized with hardware, for example, by designing an integrated circuit. In addition, the respective configurations, functions, and the like may be realized with software by a processor interpreting and executing a program that realizes each of the functions. Information of a program, a table, a file, or the like that implements each of the functions can be stored in a recording device such as a memory, a hard disk, or a solid state drive (SSD) or a recording medium such as an IC card, an SD card, or a DVD.

REFERENCE SIGNS LIST

10: sample container
12: sample disk
15: sample probe
20: first reagent probe
21: second reagent probe
24: dispensing flow path
25: metering pump
26: pressure sensor
30: stirring device
35: reaction container
36: reaction disk
40: reagent container
41: first reagent disk
42: second reagent disk
45: container cleaning mechanism
50: light source
51: spectroscopic detector
60: controller
61: timing detecting unit
62: computer
621: AD converter
622: data extraction unit
623: abnormality determination unit
66: plunger
67: driving mechanism
68: valve
69: pump
79: system solution
80: segmented air
81: aspiration solution

The invention claimed is:

1. An automatic analysis device that analyzes a sample, the device comprising:
    a light source;
    a spectroscopic detector configured to receive light from the light source;
    a dispensing probe having a flow path that aspirates or discharges the sample;
    a metering pump and a valve, the metering pump and the dispensing probe connected via the flow path of the dispensing probe,
    a pressure sensor disposed between the dispensing probe and the metering pump that measures a pressure in the dispensing probe;
    a controller connected to the dispensing probe, the metering pump and the pressure sensor, that controls an operation of the dispensing probe; and
    memory that stores a pre-defined expression including a normal waveform parameter representing a waveform of pressure previously measured by the pressure sensor after a normal aspiration of the sample,
    wherein the controller is configured to:
    control the metering pump and the valve to aspirate a sample and control the pressure sensor to continuously measure a pressure waveform of the pressure within the dispensing probe and the flow path during aspiration of the sample and for a predetermined period of time after a stop of the metering pump and before discharge of the sample,
    acquire the pressure waveform from the pressure sensor, and specify a measurement result parameter representing the pressure waveform, the measurement result parameter being within the predetermined period of time and a second maximum peak after (L2+L3)/C elapses from the stop of the metering pump, L2 being a length along the flow path from the metering pump to the pressure sensor, and L3 being a length along the flow path from the pressure sensor to the sample probe, wherein the controller determines a difference between the measurement result parameter and a corresponding parameters of the normal waveform and determines whether the difference is within a predetermined threshold, wherein upon determining the difference is within the threshold, control the dispensing probe to discharge the sample, and wherein upon determining the difference is not within the threshold output a signal indicating the dispensing probe does not normally aspirate the sample.

2. The automatic analysis device according to claim 1, wherein the dispensing probe includes a plunger that aspirates or discharges the sample by applying a pressure to the sample filling the flow path, wherein during a period of time from when the flow path is filled with the sample to when the dispensing probe is pulled up from the sample, the controller is configured to move the plunger in a direction in which the sample is discharged by a distance where the sample in the flow path is not completely discharged, and wherein the controller is configured to:

acquire one or more maximum values and one or more minimum values of the pressure waveform during a period from when the plunger is moved by the distance to when the dispensing probe is pulled up from the sample, upon determining a difference between the maximum value and the minimum value are in a predetermined threshold range, determine that the dispensing probe normally aspirates the sample, and upon determining at least either the maximum value or the minimum value is outside of the predetermined threshold range, output a signal indicating that the dispensing probe does not normally aspirate the sample.

3. The automatic analysis device according to claim 1, wherein the dispensing probe has a second flow path that is filled with liquid other than the sample, wherein the controller is configured to acquire a measurement result of the pressure sensor only for a period after a data acquisition start time, and wherein the data acquisition start time is a time point at which a first elapsed time elapses after the dispensing probe ends aspiration of the sample, the first elapsed time being required for a vibration wave generated by the pressure to propagate a length of the second flow path.

4. The automatic analysis device according to claim 1, wherein the memory stores a parameter describing a damped vibration as the normal waveform parameter, and wherein the pressure waveform is a damped vibration, the controller is configured to specify a parameter indicating the damped vibration as the measurement result parameter.

5. The automatic analysis device according to claim 4, wherein the memory stores a period of a damped vibration as the normal waveform parameter, and wherein the pressure waveform is a damped vibration, the controller is configured to specify a period of the damped vibration as the measurement result parameter and execute the determination based on whether a difference between the specified period and the period described by the normal waveform parameter is within another predetermined threshold.

* * * * *